(12) United States Patent
Cao et al.

(10) Patent No.: US 9,059,904 B2
(45) Date of Patent: Jun. 16, 2015

(54) METHOD AND SYSTEM FOR INTERMEDIATE NODE TO LOCATE A FAULT INDEPENDENTLY

(71) Applicant: Huawei Technologies Co., Ltd., Shenzhen, Guangdong (CN)

(72) Inventors: Zhen Cao, Beijing (CN); Xiangdong Yin, Beijing (CN); Wenneng Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 245 days.

(21) Appl. No.: 13/718,921

(22) Filed: Dec. 18, 2012

(65) Prior Publication Data

US 2013/0100824 A1 Apr. 25, 2013

Related U.S. Application Data

(63) Continuation of application No. PCT/CN2011/075189, filed on Jun. 2, 2011.

(30) Foreign Application Priority Data

Oct. 27, 2010 (CN) .......................... 2010 1 0521265

(51) Int. Cl.
*H04L 12/26* (2006.01)
*H04L 12/24* (2006.01)
(52) U.S. Cl.
CPC ............ *H04L 41/0677* (2013.01); *H04L 43/10* (2013.01); *H04L 43/12* (2013.01)
(58) Field of Classification Search
CPC .................................................. H04L 41/0677
USPC .................................................. 370/241–253
See application file for complete search history.

(56) References Cited

U.S. PATENT DOCUMENTS

| 2003/0145105 | A1 | 7/2003 | Desineni et al. | |
|---|---|---|---|---|
| 2005/0135363 | A1* | 6/2005 | Horinouchi et al. | .......... 370/389 |
| 2005/0147051 | A1 | 7/2005 | Suri | |

(Continued)

FOREIGN PATENT DOCUMENTS

| CN | 1741480 A | 3/2006 |
|---|---|---|
| CN | 1874298 A | 12/2006 |

(Continued)

OTHER PUBLICATIONS

Supplementary European Search Report dated Jan. 18, 2012 in connection with European Patent Application No. EP 11 78 3075.

(Continued)

*Primary Examiner* — Pao Sinkantarakorn (57) ABSTRACT

A method for an intermediate node to locate a fault independently, where the intermediate node serves to forward a packet between a first end node and a second end node, the method includes: creating a test packet and sending the test packet to the first end node, where the test packet includes address information of the second end node, and the test packet is used to trigger the first end node to send a response packet to the second end node; forwarding the response packet from the first end node to the second end node; capturing the response packet; and analyzing, according to a result of the packet capturing, whether a packet from the first end node to the second end node can be forwarded normally.

11 Claims, 6 Drawing Sheets

(56) References Cited

U.S. PATENT DOCUMENTS

| | | |
|---|---|---|
| 2007/0230358 A1 | 10/2007 | Narayanan et al. |
| 2008/0112331 A1 | 5/2008 | Long et al. |
| 2010/0205481 A1 | 8/2010 | Zheng |
| 2011/0310727 A1 | 12/2011 | Guo et al. |

FOREIGN PATENT DOCUMENTS

| | | |
|---|---|---|
| CN | 1968163 A | 5/2007 |
| CN | 101132319 A | 2/2008 |
| CN | 101155078 A | 4/2008 |
| CN | 101174975 A | 5/2008 |
| CN | 101222370 A | 7/2008 |
| CN | 101232343 A | 7/2008 |
| CN | 101410820 A | 4/2009 |
| CN | 101420335 A | 4/2009 |
| CN | 101420342 A | 4/2009 |
| CN | 101431448 A | 5/2009 |
| CN | 101505242 A | 8/2009 |
| CN | 101510849 A | 8/2009 |
| CN | 101605063 A | 12/2009 |
| CN | 101640672 A | 2/2010 |
| CN | 101826989 A | 9/2010 |
| CN | 101958810 A | 1/2011 |
| EP | 2 187 565 A1 | 5/2010 |

OTHER PUBLICATIONS

International Search Report dated Sep. 8, 2011 in connection with International Patent Application No. PCT/CN2011/075189.

Translation of Office Action dated Jan. 31, 2012 in connection with Chinese Patent Application No. 201010521265.8.

* cited by examiner

Router C　　　　　　　Router H　　　　　　　Router E

METHOD AND SYSTEM FOR INTERMEDIATE NODE TO LOCATE A FAULT INDEPENDENTLY

CROSS-REFERENCE TO RELATED APPLICATIONS

This application is a continuation of International Application No. PCT/CN2011/075189, filed on Jun. 2, 2011, which claims priority to Chinese Patent Application No. 201010521265.8, filed on Oct. 27, 2010, both of which are hereby incorporated by reference in their entireties.

TECHNICAL FIELD

The present disclosure relates to the field of network transmission, and in particular, to a method and a system for an intermediate node in a link to locate a fault independently.

BACKGROUND

With the development of communication technologies, it is important to ensure quality of data transmission. One aspect of ensuring data transmission quality is to detect a link fault quickly and locate the fault to facilitate maintenance of the link when the data transmission is faulty, for example, the voice of a call is not clear.

Figure 1:
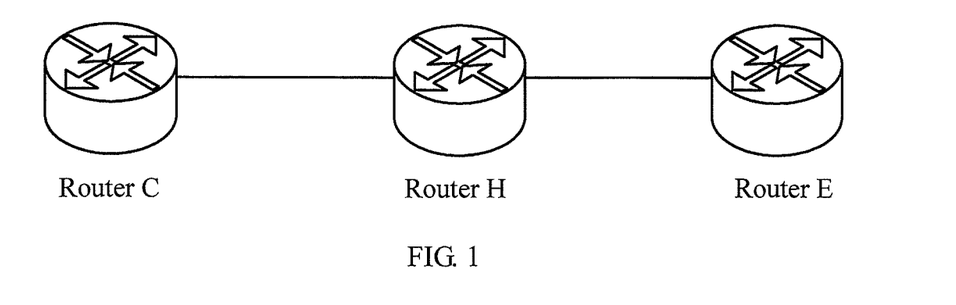
FIG. 1 is a schematic structural diagram of a common composition of a link.

FIG. 1 shows a common composition of a link. As shown in FIG. 1, routers C, H, and E form a link. The routers C and E are end nodes (End Node, EN) of the link, and the router H is an intermediate node (Intermediate Node, IN) of the link. A data transmission process begins with sending data from a source end node, and ends with receiving all data correctly at the destination end node. In the data transmission process, when the user discovers quality deterioration of an end-to-end link between the router C and the router E, such as data delay or packet loss, it is necessary to determine whether the link quality deterioration is related to the router H.

To solve such a problem, the router H may ping C and ping E respectively. Ping is a technology of checking whether a channel or device is normal. The router H pings the node C, namely, the router H sends N ICMP (Internet Control Message Protocol, Internet Control Message Protocol) packets A. After the packets A arrive at the node C, the node C sends N packets A' to the node H. The router H pings the node E, namely, the router H sends M ICMP packets B. After the packets B arrive at the node E, the node E sends M packets B' to the node H, where N and M are natural numbers.

In the foregoing solution, the path followed by the packets of the two ping operations in the router H may be not completely the same as the path followed by the packets, which are forwarded by the router H and between the node C and the node E, in the router H. Therefore, the ping result is not enough for determining whether the link quality deterioration is related to the router H.

SUMMARY

Embodiments of the present disclosure provide a method and a system for an intermediate node to locate a fault independently, in which a single node can locate a fault independently so that the maintenance efficiency against a fault is improved and the data transmission quality is ensured.

According to an aspect of an embodiment of the present disclosure, a method for an intermediate node to locate a fault independently, where the intermediate node serves to forward a packet between a first end node and a second end node. The method includes:

creating a test packet and sending the test packet to the first end node, where the test packet includes address information of the second end node, and the test packet is used to trigger the first end node to send a response packet to the second end node;

forwarding the response packet from the first end node to the second end node;

capturing the response packet; and analyzing, according to a result of the packet capturing, whether a packet from the first end node to the second end node can be forwarded normally.

According to another aspect of an embodiment of the present disclosure, a system for an intermediate node to locate a fault independently, where the intermediate node serves to forward a packet between a first end node and a second end node. The system includes:

a creating unit, configured to create a test packet and send test packet to the first end node, where the test packet includes address information of the second end node, and the test packet is used to trigger the first end node to send a response packet to the second end node;

a forwarding unit, configured to forward the response packet from the first end node to the second end node;

a packet capturing unit, configured to capture the response packet; and an analyzing unit, configured to analyze, according to a result of the packet capturing, whether a packet from the first end node to the second end node can be forwarded normally.

In the embodiments of the present disclosure, a test packet is generated under independent control of an intermediate node in a link without depending on end nodes of the link. The test packet triggers the end node to generate a response packet directed to a peer node, and the intermediate node forwards the response packet. The forwarding path followed by the response packet in the intermediate node is the same as the forwarding path followed by a corresponding end-to-end service packet in the intermediate node. Therefore, a result of analyzing the captured response packets is enough for determining whether the intermediate node is able to forward an end-to-end packet normally, thereby implementing the fault locating. In a networking scenario with mixed devices of a plurality of vendors, the technical solution of the present disclosure enables an intermediate node of a single vendor to locate a fault, thereby improving maintenance efficiency against faults and ensuring data transmission quality.

BRIEF DESCRIPTION OF THE DRAWINGS

To make the technical solution of the present disclosure clearer, the following outlines the accompanying drawings used in description of the embodiments of the present disclosure. Evidently, the outlined drawings are examples only, and persons of ordinary skill in the art may derive other drawings from them without any creative effort.

DETAILED DESCRIPTION

The technical solution of the present disclosure is applicable to link fault locating. To transmit data in a network, two types of nodes are defined: an end node (End Node, EN) and an intermediate node (Intermediate Node, IN). The end nodes and the intermediate nodes collectively form a link. A data transmission process begins with sending data from a source end node, and ends with receiving all data correctly at a destination end node. An intermediate node provides data forwarding and route selecting service for end-to-end data transmission, namely, the data sent by the source end node is forwarded through the intermediate node to the destination end node. The end nodes that form the link and the intermediate node that forms the link may be various network elements and/or a system which integrates network elements with terminals operating the network elements. The network elements may include, but are not limited to, routers, hosts, gateways, and switches. In the following embodiments, when the intermediate node is a network element, the packet capturing function is integrated in the network element; when the intermediate node is a system that includes a network element and a terminal operating the network element, the packet capturing function may be integrated in the terminal operating the network element.

Figure 2:
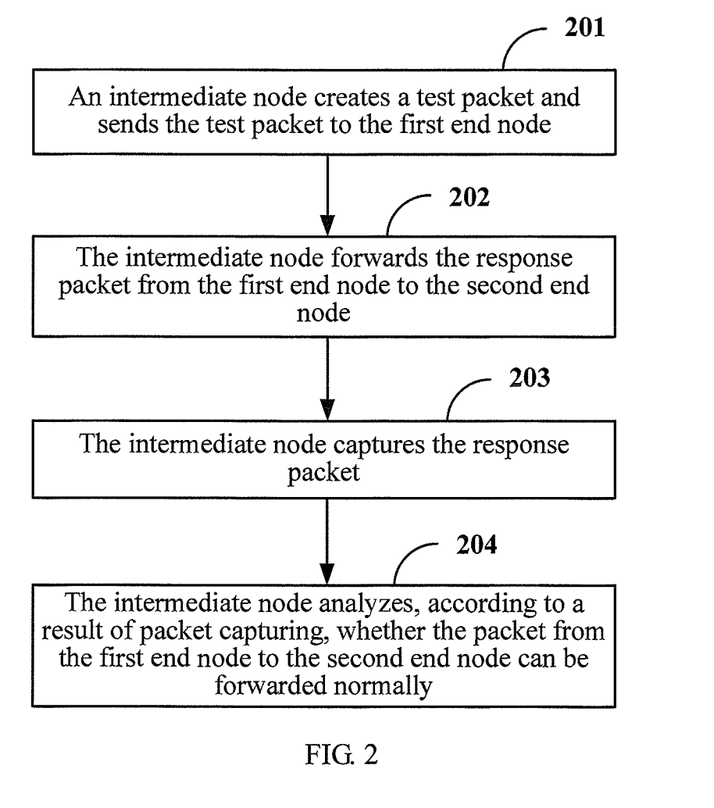
FIG. 2 is a schematic flowchart of a method for an intermediate node to locate a fault independently according to an embodiment of the present disclosure.

Referring to FIG. 2, an embodiment of the present disclosure provides a method for an intermediate node to locate a fault independently. In this method, the intermediate node serves to forward a packet between a first end node and a second end node. The method may specifically include:

In step 201, an intermediate node creates a test packet and sends the test packet to the first end node. The test packet includes address information of the second end node. The test packet is used to trigger the first end node to send a response packet to the second end node. The response packet includes information of a destination address, and the destination address is the second end node address.

Specifically, the test packet may be a common type of packet in the existing IP network, and for example, may be, but is not limited to, a ping packet, or an Address Resolution Protocol (Address Resolution Protocol, ARP) packet.

The intermediate node may create many types of test packets. For example, in an embodiment of the present disclosure, the test packet includes information of the second end node address and a first end node address. The second end node address serves as a source address of the test packet, and the first end node address serves as a destination address of the test packet. In another embodiment of the present disclosure, the test packet includes information of the second end node address, and the second end node address serves as the destination address of the test packet.

The intermediate node may send the test packet in many modes. In an embodiment of the present disclosure, when the destination address of the test packet is the first end node address, the test packet is sent to the first end node directly. In another embodiment of the present disclosure, when the destination address of the test packet is the second end node address, the test packet is sent to the first end node through a specified outgoing interface.

In step 202, the intermediate node forwards the response packet from the first end node to the second end node.

The forwarding path that the response packet passed in the intermediate node is the same as the forwarding path that a corresponding end-to-end service packet passed in the intermediate node. That is, in this embodiment, the response packet is used to simulate an end-to-end service packet.

In another embodiment of the present disclosure, to improve the fault locating capability of the intermediate node, features of the response packet may be further set according to features of the end-to-end service packet. Specifically, when the test packet is created in step 201, the test packet may be configured to control the features of the response packet. The features of the response packet may include, but are not limited to: priority, sending frequency, length, and/or 5-tuple. The 5-tuple includes a source IP address, a source port, a destination IP address, a destination port, and a protocol type. Configuring the test packet may include: configuring the content of the test packet, and configuring the sending of the test packet. In an embodiment of the present disclosure, configuring the content of the test packet may include, but is not limited to: carrying desired features of the response packet in a type of service (Type Of Service, TOS) field of the test packet. In another embodiment of the present disclosure, configuring the sending of the test packet may include, but is not limited to: setting the features such as size of the test packet, frequency of the test packet, and port number of the test packet to control the features of the response packet accordingly.

In step 203, the intermediate node captures the response packet.

The packet may be captured according to the type of the response packet or the features of the response packet. In an embodiment of the present disclosure, capturing the packet according to the type of the response packet is to capture a ping packet or an ARP packet, for example. In another embodiment of the present disclosure, capturing the packet according to the features of the response packet is to perform capturing according to different lengths of the packets, for example.

The packets may be captured in many modes. In an embodiment of the present disclosure, when the intermediate node supports a DEBUG mode, the corresponding DEBUG monitoring is enabled so that the specific packets such as data packets of packets can be captured. In another embodiment of the present disclosure, when the intermediate node supports mirroring, the traffic of a port of the intermediate node may be mirrored to a port connected with a packet capturing module, and the packets are captured through the packet capturing module. The traffic includes incoming traffic and outgoing traffic. The packet capturing module refers to a module on which a packet capturing tool is installed. The packet capturing module is integrated in the intermediate node. The ports of the intermediate node include but are not limited to: a port that connects the intermediate node with the first end node, and the port that connects the intermediate node with the second end node.

In step 204, the intermediate node analyzes, according to a result of packet capturing, whether the packet from the first end node to the second end node can be forwarded normally.

In an embodiment of the present disclosure, according to the number and/or delay of received and sent response packets, it may be determined whether the intermediate node can forward the packet from the first end node to the second end node normally. In another embodiment of the present disclosure, according to the period of receiving and sending response packets, and so on, it may be determined whether the intermediate node can forward the packet from the first end node to the second end node normally. The basis for determining may be preset. For example, if the number of the received response packets is the same as the number of the sent response packets, or the difference between the number of the received response packets and the number of the sent response packets falls within an error range, the intermediate node can forward the packet from the first end node to the second end node normally; otherwise, the intermediate node cannot forward the packet normally; if the delay between receiving and sending the response packets falls within a normal delay range, the intermediate node can forward the packet from the first end node to the second end node normally; otherwise, the intermediate node cannot forward the packet normally, and so on. The normal forwarding may be determined if one parameter meets a preset condition or if multiple parameters meet preset conditions respectively.

The result of capturing the response packets may be used to analyze whether the intermediate node can forward the packet from the first end node to the second end node normally. In another embodiment of the present disclosure, the test packet may be captured in step 203; correspondingly, in step 204, the results of capturing the test packets and the response packets may be used to analyze whether a packet transmission delay exists on the link between the intermediate node and the first end node, and analyze whether any packet is distorted abnormally, thereby better ensuring the data transmission quality.

The method according to the embodiment of the present disclosure may be used to locate whether a fault of sending the packet from the first end node to the second end node is related to the intermediate node. Likewise, the method according to the embodiment of the present disclosure may be used to locate whether a fault of sending the packet from the second end node to the first end node is related to the intermediate node. The difference is: The test packet is sent to the second end node, but the response packet is forwarded from the second end node to the first end node.

In the following embodiments, it is assumed that the end nodes are network elements, and the intermediate node is a system that includes a network element and a terminal operating the network element, where the network element is a router. In the case that the intermediate node is a network element only, the principle is the same.

Embodiment 1

Figure 3:
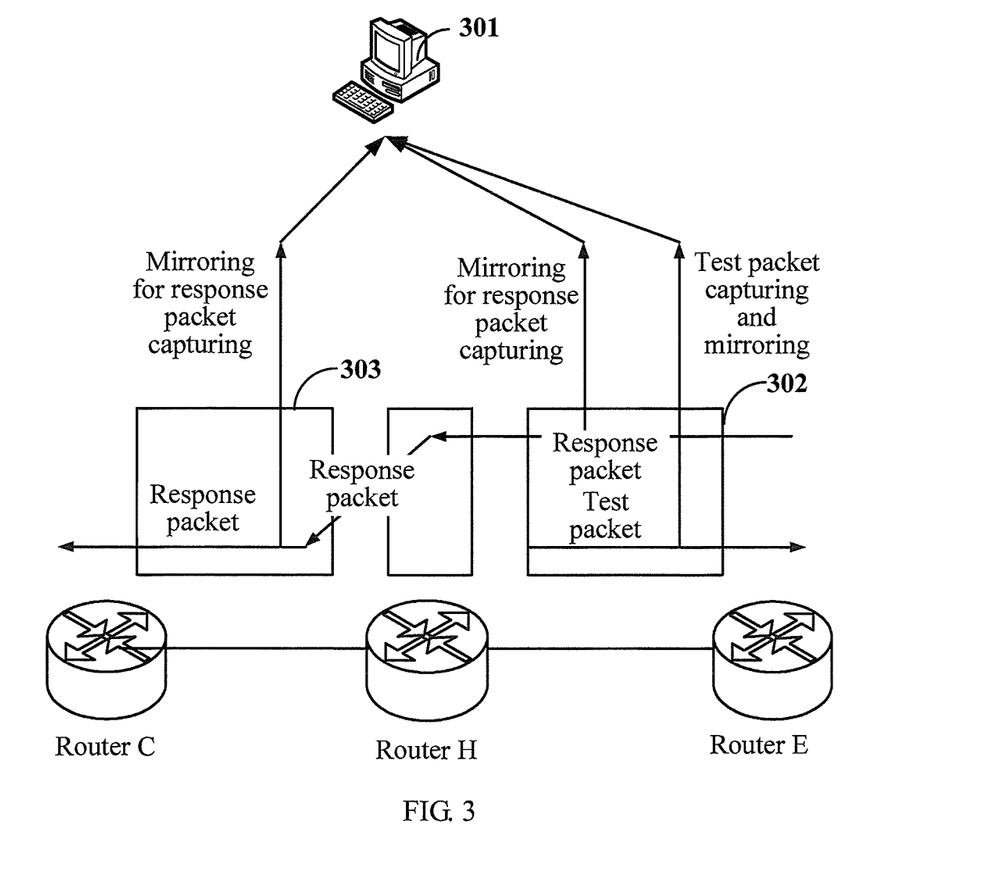
FIG. 3 is a schematic flowchart of capturing a packet on a link according to an embodiment of the present disclosure.
Figure 4:
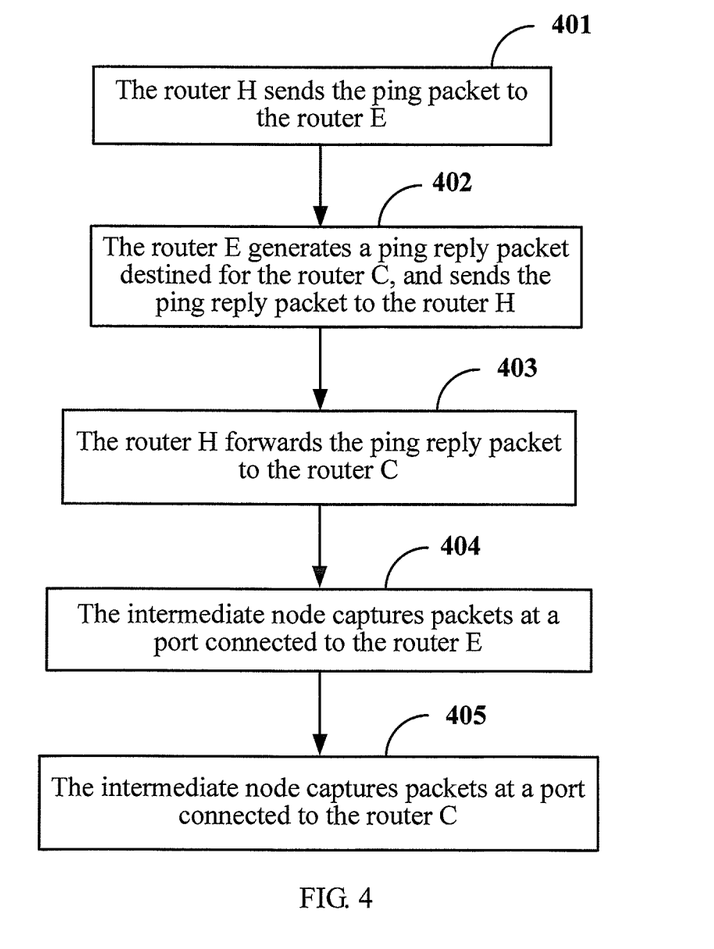
FIG. 4 is a schematic flowchart of a method for an intermediate node to locate a fault independently according to Embodiment 1 of the present disclosure.

As shown in FIG. 3, routers C, H, and E form a link, and routers C and E are end nodes of the link. An intermediate node of the link includes the router H and a packet capturing module 301. The packet capturing module 301 is a host on which a packet capturing function is installed. The packet capturing module 301 is configured to capture packets on the router H. A port that connects the router H with the router E is a port 302, and a port that connects the router H with the router C is a port 303. When the quality of the end-to-end link between the router C and the router E deteriorates, the router H initiates fault locating, and determines whether the link quality deterioration is related to the intermediate node (the router H). As shown in FIG. 4, this embodiment is implemented through a ping function supported by the network element, and a specific process is as follows:

In step 401, a test packet is a ping packet created by the router H. The router H sends the ping packet to the router E. The ping packet includes source address information and destination address information. The source address is an IP address of the router C, and the destination address is an IP address of the router E.

In step 402, after the router E receives the ping packet, according to the source address in the ping packet, the router E generates a ping reply packet (namely, a response packet) destined for the router C and sends the ping reply packet to the router H.

In step 403, the router H forwards the ping reply packet to the router C. After receiving the ping reply packet, the router C may perform discarding according to a protocol, thereby avoiding impact on normal operation of the network.

In step 404, the intermediate node captures packets at the port connected to the router E. Specifically, the incoming traffic (namely, the ping reply packet) of the port 302, which connects the router H with the router E, is mirrored onto the packet capturing module 301, and the packet capturing module 301 captures the ping reply packet. Further, the outgoing traffic (namely, the ping packet) of the port 302, which connects the router H with the router E, may be mirrored onto the packet capturing module 301, and the packet capturing module 301 captures the ping packet.

In step 405, the intermediate node captures packets at the port connected to the router C. Specifically, the outgoing traffic (namely, the ping packet) of the port 303, which connects the router H with the router C, is mirrored onto the packet capturing module 301, and the packet capturing module 301 captures the ping reply packet.

Step 404 may occur after step 402 and before step 403 (not illustrated in FIG. 4), or step 404 may occur in parallel with step 405 after step 403 (not illustrated in FIG. 4); or, step 404 occurs after step 403 and before step 405.

The information such as the number and/or delay of ping reply packets received by the intermediate node may be compared with that of those sent by the intermediate node to determine whether the intermediate node can forward the packet from the router E to the router C normally. Further, the information such as the number and/or delay of ping packets sent through the intermediate node may be compared with that of the ping reply packets sent through the intermediate node to determine whether the router H can forward the packet from the router E to the router C normally. Likewise, it is verifiable whether the intermediate node can forward the packet from the router C to the router E normally.

Embodiment 2

Figure 5:
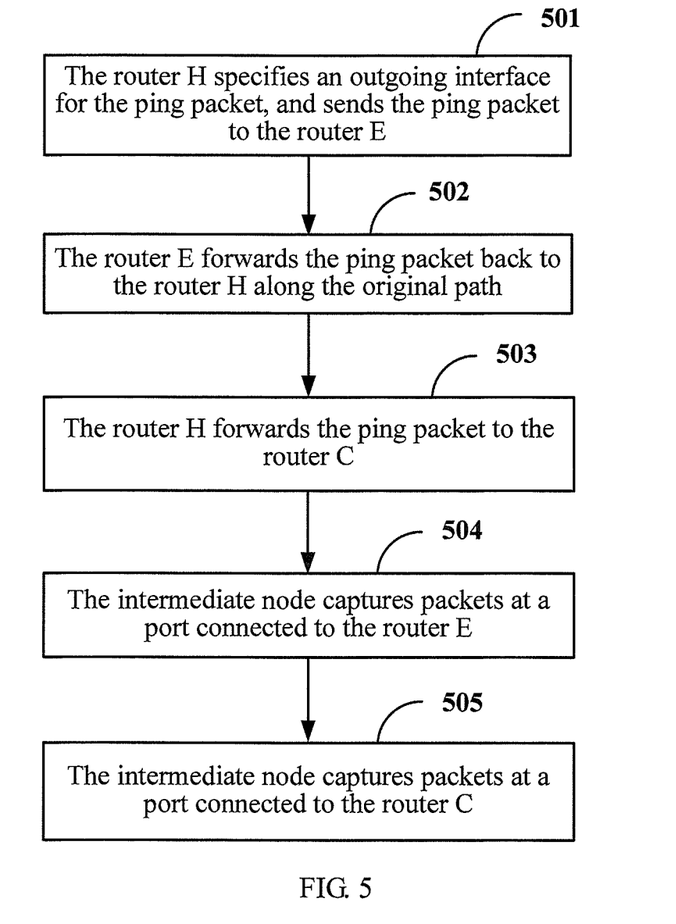
FIG. 5 is a schematic flowchart of a method for an intermediate node to locate a fault independently according to Embodiment 2 of the present disclosure.

In FIG. 3, when the quality of the end-to-end link between the router C and the router E deteriorates, the router H initiates fault locating, and uses a ping function supported by the network element to determine whether the link quality deterioration is related to the intermediate node (the router H). As shown in FIG. 5, a specific process is as follows:

In step 501, a test packet is a ping packet created by the router H. The ping packet includes destination address information. The destination address is an IP address of the router C. The router H specifies an outgoing interface for a ping packet, and sends the ping packet to the router E.

In step 502, after receiving the ping packet, the router E searches a forwarding table, and the router E forwards the ping packet back to the router H along the original path. The ping packet forwarded back to the router H is a response packet.

In step 503, the router H forwards the ping packet to C.

In step 504, the intermediate node captures packets at a port connected to the router E.

In step 505, the intermediate node captures packets at a port connected to the router C.

Embodiment 3

Figure 6:
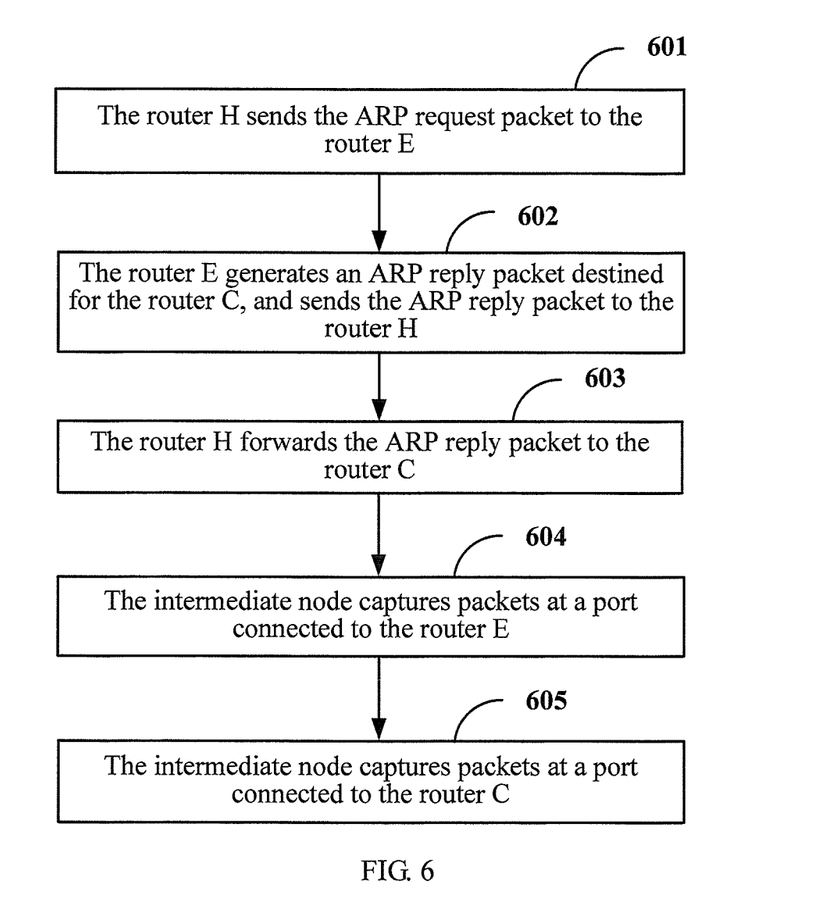
FIG. 6 is a schematic flowchart of a method for an intermediate node to locate a fault independently according to Embodiment 3 of the present disclosure.

In FIG. 3, when the quality of the end-to-end link between the router C and the router E deteriorates, the router H initiates fault locating, and uses an ARP function supported by the network element to determine whether the link quality deterioration is related to the intermediate node (the router H). As shown in FIG. 6, a specific process is as follows:

In step 601, a test packet is an ARP request packet created by the router H. The intermediate node sends the ARP request packet to the router E. The ARP request packet includes source address information and destination address information. The source address is an IP address of the router C, and the destination address is an IP address of the router E.

In step 602, after the router E receives the ARP request packet, the router E generates an ARP reply packet (namely, a response packet) destined for the router C according to the ARP protocol, and sends the ARP reply packet to the router H.

In step 603, the router H forwards the ARP reply packet to the router C.

In step 604, the intermediate node captures packets at a port connected to the router E.

In step 605, the intermediate node captures packets at a port connected to the router C.

In a networking scenario with mixed devices of a plurality of vendors, the technical solution provided in the foregoing embodiment enables an intermediate node of a single vendor to locate a fault. If the problem lies in an intermediate node, the fault can be quickly removed, thereby improving maintenance efficiency against faults and ensuring data transmission quality. If it is determined that the problem does not lie in the intermediate nodes, the maintenance costs of the intermediate node devices are reduced, and recognition on the intermediate node devices is improved.

Figure 7:
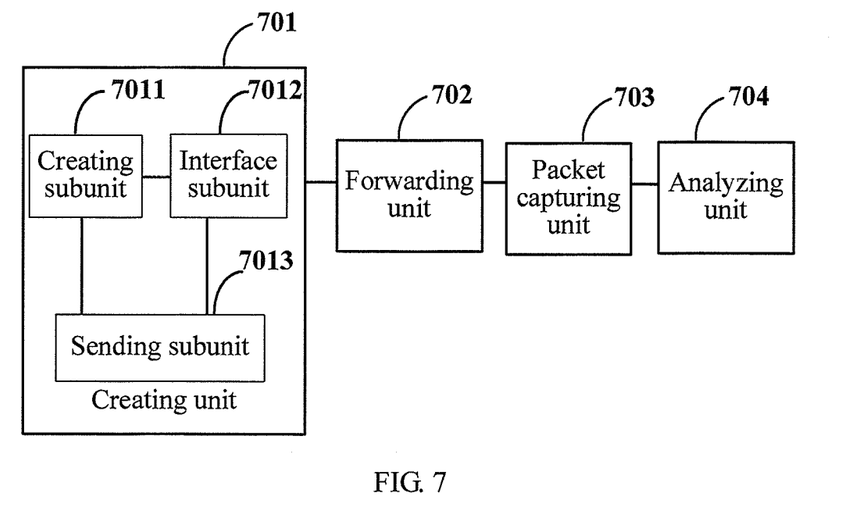
FIG. 7 is a schematic structural diagram of a system for an intermediate node to locate a fault independently according to an embodiment of the present disclosure.

An embodiment of the present disclosure provides a system for an intermediate node to locate a fault independently, where the system may be integrated in an intermediate node, and the intermediate node serves to forward a packet between a first end node and a second end node. As shown in FIG. 7, the system includes a creating unit 701, a forwarding unit 702, a packet capturing unit 703, and an analyzing unit 704.

The creating unit 701 is configured to create a test packet and send the test packet to the first end node. The test packet includes address information of the second end node. The test packet is used to trigger the first end node to send a response packet to the second end node. The response packet includes destination address information. The destination address is the second end node address. The creating unit may further be configured to configure the test packet to control features of the response packet.

The forwarding unit 702 is configured to forward the response packet from the first end node to the second end node;

The packet capturing unit 703 is configured to capture the response packet.

The analyzing unit 704 is configured to analyze, according to a result of the packet capturing, whether the intermediate node is able to forward the packet from the first end node to the second end node normally.

The creating unit 701 may create the test packet and send the test packet to the first end node in many ways:

In an embodiment of the present disclosure, the test packet includes source address information and destination address information. The source address is the second end node address, and the destination address is the first end node address. The creating unit 701 sends the test packet to the first end node directly.

In another embodiment of the present disclosure, the creating unit 701 may include a creating subunit 7011, an interface subunit 7012, and a sending subunit 7013.

The creating subunit 7011 is configured to create a test packet. The test packet includes destination address information, and the destination address is the second end node address.

The interface subunit 7012 is configured to specify an outgoing interface for the test packet.

The sending subunit 7013 is configured to send the test packet to the first end node through the outgoing interface.

In an embodiment of the present disclosure, the packet capturing unit 703 may capture packets through DEBUG monitoring. In another embodiment of the present disclosure, the packet capturing unit 703 may capture packets through mirroring. In the implementation manner where packets are captured through mirroring, the packet capturing unit 703 may include:

a first packet capturing module, configured to capture the response packet at a port connected to the first end node; and a second packet capturing module, configured to capture the response packet at a port connected to the second end node.

In an embodiment of the present disclosure, the first packet capturing module may include:

a first mirroring submodule, configured to capture a response packet by mirroring incoming traffic at a port connected to the first end node.

In another embodiment of the present disclosure, the first packet capturing module may further include:

a second mirroring submodule, configured to capture test packets by mirroring outgoing traffic at the port connected to the first end node.

In an embodiment of the present disclosure, the second packet capturing module may include:

a mirroring submodule, configured to capture a response packet by mirroring outgoing traffic at a port connected to the second end node.

In the implementation manner where the packets are captured through mirroring, a packet capturing tool may be installed on the intermediate node. A module with an installed packet capturing tool on the intermediate node is called a packet capturing module. The capturing function of the packet capturing unit and the analysis function of the analyzing unit may be integrated in the packet capturing module.

In the embodiments of the present disclosure, the creating unit creates a test packet, the test packet triggers an end node to generate a response packet directed to a peer node, and the forwarding unit forwards the response packet. The forwarding path that the response packet passed in the intermediate node is the same as the forwarding path that a corresponding end-to-end service packet passed in the intermediate node. Therefore, the analyzing unit performs analysis according to a result of packet capturing with respect to the response packets captured by the packet capturing unit to determine whether the intermediate node is able to forward the end-to-end packet normally, thereby implementing the fault locating.

Through the description in the foregoing embodiments, persons skilled in the art are clearly aware that the embodiments of the present disclosure may be implemented through hardware, or through software in addition to a necessary universal hardware platform. Therefore, all or part of the novelty of the present disclosure may be embodied in a software product. The software product may be stored in a storage medium such as a ROM/RAM, a magnetic disk, or an optical disk, and incorporates several instructions causing a computer device (such as a personal computer, a server, or a network device) to execute the method specified in any embodiment of the present disclosure or a part of the embodiment.

The above descriptions are merely exemplary embodiments of the present disclosure, but not intended to limit the protection scope of the present disclosure. Any person skilled in the art can readily conceive variations and modifications under the teachings by the present disclosure, and such variations and modifications shall fall within the scope of the present disclosure.

What is claimed is:

1. A method for an intermediate node to locate a fault independently, wherein the intermediate node serves to forward a packet between a first end node and a second end node, the method comprising:
    creating, by the intermediate node, a test packet and sending the test packet to the first end node, wherein the test packet comprises address information of the second end node, and the test packet is used to trigger the first end node to send a response packet to the second end node;
    forwarding, by the intermediate node, the response packet from the first end node to the second end node;
    capturing, by the intermediate node, the response packet;
    analyzing, by the intermediate node according to a result of the packet capturing, whether a packet from the first end node to the second end node is able to be forwarded normally; and
    wherein the test packet further comprises address information of the first end node, the second end node address serves as a source address of the test packet, and the first end node address serves as a destination address of the test packet.

2. The method according to claim 1, wherein:
    the second end node address serves as a destination address of the test packet; and
    creating, by the intermediate node, the test packet and sending the test packet to the first end node, comprise:
    specifying an outgoing interface for the test packet; and
    sending the test packet to the first end node through the outgoing interface.

3. The method according to claim 2, wherein:
    the test packet is a ping packet or an address resolution protocol packet.

4. The method according to claim 1, wherein:
    the test packet is a ping packet or an address resolution protocol packet.

5. The method according to claim 1, wherein:
    the test packet is a ping packet or an address resolution protocol packet.

6. The method according to claim 1, wherein:
    creating the test packet and sending the test packet to the first end node further comprise:
    configuring the test packet to control features of the response packet.

7. The method according to claim 6, wherein:
    capturing the response packet comprises:
    capturing the packets according to the features of the response packet.

8. The method according to claim 7, wherein:
    the features of the response packet comprise: priority, sending frequency, length, and/or 5-tuple.

9. The method according to claim 6, wherein:
    the features of the response packet comprise: priority, sending frequency, length, and/or 5-tuple.

10. A system for an intermediate node to locate a fault independently, wherein the intermediate node serves to forward a packet between a first end node and a second end node, the system comprising:
    a creating unit, configured to create a test packet and send the test packet to the first end node, wherein the test packet comprises address information of the second end node, and the test packet is used to trigger the first end node to send a response packet to the second end node;
    a forwarding unit, configured to forward the response packet from the first end node to the second end node;
    a packet capturing unit, configured to capture the response packet;
    an analyzing unit, configured to analyze, according to a result of the packet capturing, whether a packet from the first end node to the second end node is able to be forwarded normally; and
    wherein the test packet further comprises address information of the first end node, the second end node address serves as a source address of the test packet, and the first end node address serves as a destination address of the test packet.

11. The system according to claim 10, wherein the creating unit comprises:
    a creating subunit, configured to create the test packet, wherein the second end node address serves as a destination address of the test packet;
    an interface subunit, configured to specify an outgoing interface for the test packet; and
    a sending subunit, configured to send the test packet to the first end node through the outgoing interface.

* * * * *